US011070911B2

(12) United States Patent
Groene et al.

(10) Patent No.: US 11,070,911 B2
(45) Date of Patent: Jul. 20, 2021

(54) PERSONAL SOUND ZONE SYSTEM

(71) Applicant: KARMA AUTOMOTIVE LLC, Irvine, CA (US)

(72) Inventors: Michael Groene, Laguna Niguel, CA (US); Andre Franco Luis, Orange, CA (US); Joe Durre, Irvine, CA (US); George Huan, Irvine, CA (US)

(73) Assignee: Karma Automotive LLC, Irvine, CA (US)

( * ) Notice: Subject to any disclaimer, the term of this patent is extended or adjusted under 35 U.S.C. 154(b) by 0 days.

(21) Appl. No.: 16/457,024

(22) Filed: Jun. 28, 2019

(65) Prior Publication Data

US 2020/0329307 A1 Oct. 15, 2020

Related U.S. Application Data

(60) Provisional application No. 62/832,386, filed on Apr. 11, 2019.

(51) Int. Cl.
*H04B 1/00* (2006.01)
*H04R 1/40* (2006.01)
*H04R 5/02* (2006.01)

(52) U.S. Cl.
CPC ............. *H04R 1/406* (2013.01); *H04R 5/023* (2013.01); *H04R 2410/01* (2013.01); *H04R 2499/13* (2013.01)

(58) Field of Classification Search
CPC ........................................................ H04B 1/00
See application file for complete search history.

(56) References Cited

U.S. PATENT DOCUMENTS 6,744,898 B1 6/2004 Hirano
10,390,136 B2 * 8/2019 Ohta ........................ B60R 11/02
2005/0213786 A1 * 9/2005 Kernels ..................... H04R 5/02 381/302
2012/0230504 A1 * 9/2012 Kuroda ............ G10K 11/17857 381/71.4
2013/0170668 A1 * 7/2013 Hess .......................... H04S 7/30 381/107
2014/0226831 A1 * 8/2014 Tzirkel-Hancock ......................... G10K 11/17813 381/71.7
2016/0029111 A1 * 1/2016 Wacquant .............. H04R 3/005 381/71.4
2016/0100250 A1 * 4/2016 Baskin ................... B60N 2/879 297/217.4
2017/0193976 A1 * 7/2017 Mohammad ..... G10K 11/17857
2017/0353693 A1 * 12/2017 Semsey ............. H04M 1/72527
2018/0198541 A1 * 7/2018 Harris ...................... H04W 4/80
(Continued)

*Primary Examiner* — Olisa Anwah
(74) *Attorney, Agent, or Firm* — Gordon Rees Scully Mansukhani, LLP

(57) ABSTRACT

An audio system for a vehicle including a plurality of personal sound zones, each personal sound zone comprising a plurality of microphones, an audio controller, and a plurality of speakers. The system is configured to allow the occupants of a vehicle to experience their own dedicated sound environment without the sound from one dedicated sound environment interfering with the sound from another dedicated sound environment. The system includes features for controlling the audio of each dedicated sound environment, including passing audio from one dedicated sound environment to another dedicated sound environment.

14 Claims, 6 Drawing Sheets

(56) References Cited

U.S. PATENT DOCUMENTS

| | | | | |
|---|---|---|---|---|
| 2019/0088247 | A1* | 3/2019 | True | G10K 11/17823 |
| 2020/0194023 | A1* | 6/2020 | Tintor | H04R 5/027 |
| 2020/0223328 | A1* | 7/2020 | Kobayashi | B60K 37/06 |

* cited by examiner

100

PERSONAL SOUND ZONE SYSTEM

CROSS-REFERENCE TO RELATED APPLICATIONS

This application claims priority to and the benefit of U.S. Provisional Patent Application No. 62/823,386 filed Apr. 11, 2019. The foregoing provisional application is incorporated by reference herein in its entirety.

BACKGROUND

The present disclosure relates to an audio system for a vehicle including a plurality of personal sound zones.

The use of audio systems in vehicles as a means of keeping occupants of a vehicle entertained is such an entrenched industry practice that it is difficult to imagine having any sort of vehicle without an audio system. In a similar vein, conflicts between occupants of a vehicle over the control of such an audio system are just as indelible. The nature of vehicles with a shared space for occupants is such that the other occupants must tolerate the audio selections of the occupant who has control over the audio system, and depending on the audio selections of the audio-controlling occupant, the task of tolerating these audio selections may be especially difficult.

Various technologies exist for allowing people to isolate themselves from a shared acoustic space and enjoy sounds of their own selection. Most of these technologies rely on providing complete audio isolation, almost completely cutting off the user from the shared acoustic space. For the operator of a moving vehicle, the use of these isolating technologies is dangerous for themselves and for the other occupants, as isolating a vehicle operator from the local environment renders them unable to respond to potential emergencies.

Further, these audio isolation technologies are often bulky and/or uncomfortable to use, making them impractical for persons who frequently enter and exit the vehicle or those who want to set up their own dedicated audio environment with a minimum amount of fuss or who wish to selectively engage and disengage their isolation so as to communicate or share audio with other occupants.

It is desirable to find a means to provide occupants of a shared acoustic space with their own dedicated audio environments while making the process of setting up a dedicated audio environment for each occupant as simple and unobtrusive as possible and allowing for individual control of each dedicated audio environment. It is additionally desirable to find a means to interlink these dedicated audio environments at the command of each environment's occupant.

SUMMARY

Disclosed herein is an audio system for a vehicle including a plurality of personal sound zones. According to one embodiment, each personal sound zone comprises a plurality of microphones, an audio controller, and a plurality of speakers. According to one embodiment, at least one of the plurality of microphones is configured to receive a noise audio signal and produce a noise electronic signal corresponding to the noise audio signal. According to one embodiment, the audio controller is configured to receive a media electronic signal and the noise electronic signal, convert the noise electronic signal into an anti-noise electronic signal, and produce an output electronic signal by combining the media electronic signal and the anti-noise electronic signal. According to one embodiment, the plurality of speakers is configured to receive the output electronic signal and emit an output audio signal corresponding to the output electronic signal.

In another disclosed embodiment, each of the personal sound zones has a dedicated sound environment that is separate from the dedicated sound environment of the other members of the plurality of personal sound zones. In another disclosed embodiment, each member of the plurality of personal sound zones shares the same physical acoustic space while maintaining its own dedicated sound environment.

In another disclosed embodiment, the plurality of microphones and the plurality of speakers of at least one member of the plurality of personal sound zones are located in a seat.

In another disclosed embodiment, each member of the plurality of personal sound zones emulates a 3D Surround Sound environment.

In another disclosed embodiment, each member of the plurality of personal sound zones is configured to receive at least one of a plurality of commands to control the media electronic signal and the output audio signal of that personal sound zone. In another disclosed embodiment, one of the plurality of commands is a command to send the media electronic signal of that personal sound zone to another member of the plurality of personal sound zones.

In another disclosed embodiment, at least a portion of the media electronic signal received by a personal sound zone may correspond to a phone call. In another disclosed embodiment, at least a portion of the media electronic signal received by a personal sound zone may correspond to an audio alert for an occupant of that personal sound zone. In another disclosed embodiment, at least a portion of the media electronic signal received by a personal sound zone includes video data for display on a display device associated with that personal sound zone.

In another disclosed embodiment, each member of the plurality of personal sound zones cancels audio produced by the plurality of speakers of each of the other members of the plurality of personal sound zones.

Other aspects, features, and techniques will be apparent to one skilled in the relevant art in view of the following detailed description of the embodiments.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION

One aspect of the disclosure is directed to an audio system for a vehicle including a plurality of personal sound zones.

References throughout this document to "one embodiment," "certain embodiments," "an embodiment," or similar term mean that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. For example, two or more of the innovative devices described herein may be combined in a single device, but the application is not limited to the specific exemplary combinations of the audio system that are described herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the character "N" refers hereinafter to the last member of a set or the total count of members in a set. The character "X" refers hereinafter to a variable member of a set. The characters "A", "B", "C", etc. refer to a specific but otherwise undefined member of a set.

As used herein, the phrase "audio signal" refers to a vibration that typically propagates as an audible wave of pressure through a transmission medium. The phrase "electronic signal" refers to a representation of an audio signal, such that an audio playback device may receive a given electronic signal and convert it into an audio signal. Although the preferred embodiment of the electronic signal as defined in this application is as an electronic waveform, it should be understood that "electronic signal" may refer to any other means of representing audio signals in a communication medium.

A detailed description of various embodiments is provided; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

Figure 1:
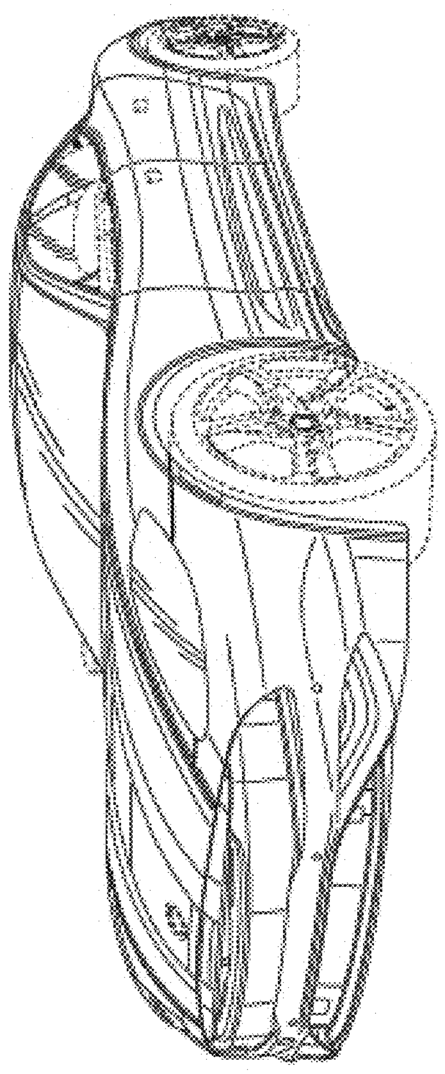
FIG. 1 is a perspective view of an exemplary embodiment of a vehicle in which a personal sound zone system may be installed.

FIG. 1 is a perspective view of an exemplary embodiment of a vehicle 100 in which a personal sound zone system 200 may be installed. The vehicle 100 shown in FIG. 1 is exemplary. The personal sound zone system 200 described herein may be used with any passenger vehicle or other vehicle designed to accommodate multiple occupants.

Figure 2:
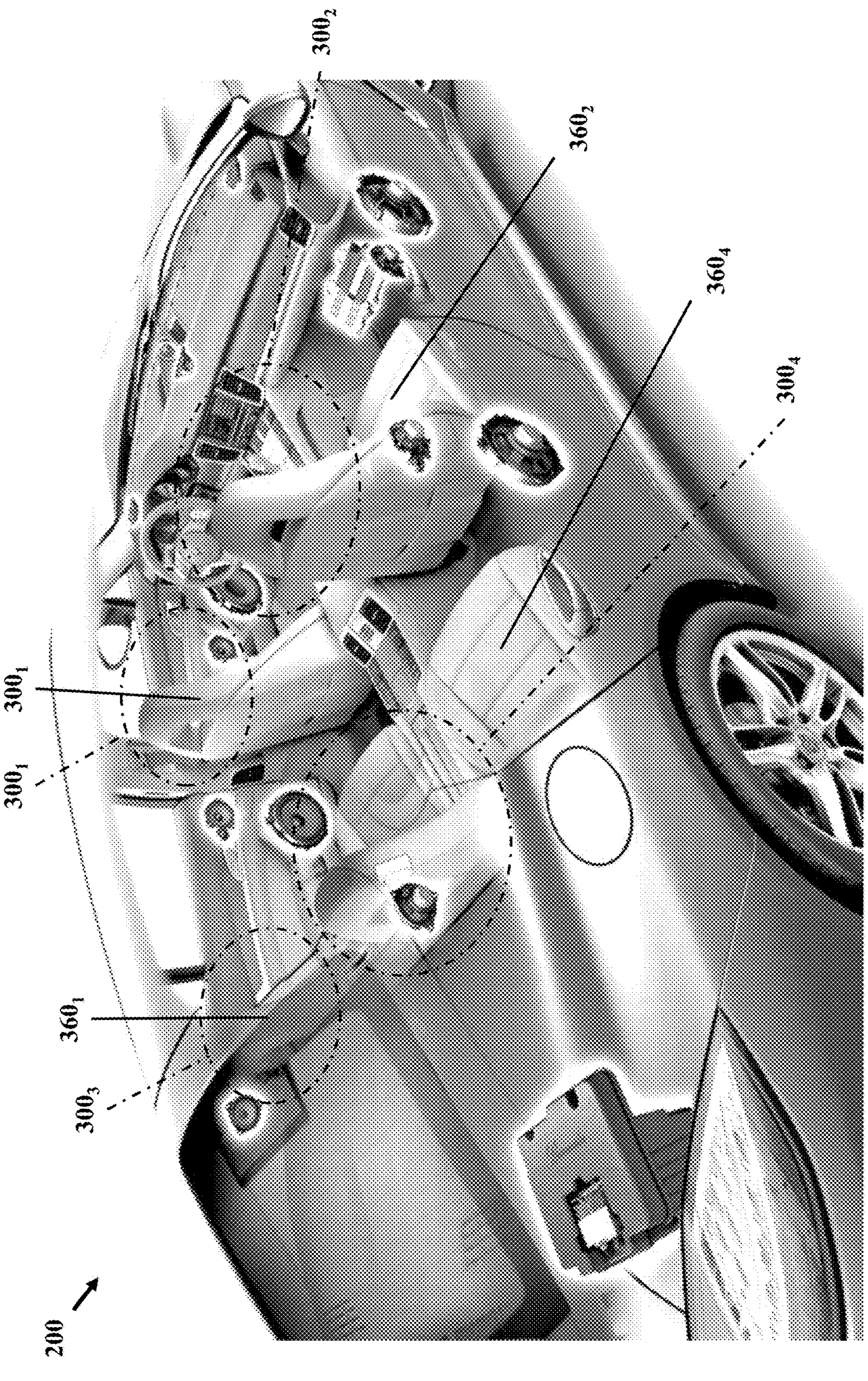
FIG. 2 is a cutaway perspective view of an exemplary embodiment of a vehicle with a personal sound zone system including a plurality of personal sound zones.

FIG. 2 is a cutaway perspective view of an exemplary embodiment of a vehicle 100 with a personal sound zone system 200 including a plurality of personal sound zones $\mathbf{300}_{1\text{-}4}$. In one embodiment, each member of the plurality of personal sound zones $\mathbf{300}_{1\text{-}4}$ shares the same physical acoustic space while maintaining its own dedicated sound environment. As depicted in FIG. 2, each of the plurality of personal sound zones $\mathbf{300}_{1\text{-}4}$ is marked with a dashed line to emphasize that each of the plurality of personal sound zones $\mathbf{300}_{1\text{-}4}$ is not particularly defined as a discrete physical entity in the physical acoustic space (i.e. each of the plurality of personal sound zones $\mathbf{300}_{1\text{-}4}$ is merely a section of air separated from other sections of air by an intangible boundary) even though each of the plurality of personal sound zones $\mathbf{300}_{1\text{-}4}$ is functionally separate from the others.

In one embodiment, each of the plurality of personal sound zones $\mathbf{300}_{1\text{-}4}$ may be associated with one of a plurality of seats $\mathbf{360}_{1\text{-}4}$ installed in the vehicle 100. A member of the plurality of personal sound zones $\mathbf{300}_X$ may use data regarding its associated seat $\mathbf{360}_X$ as factors in determining its own operations. For example, a member of the plurality of personal sound zones $\mathbf{300}_X$ may use data regarding the location of the seat $\mathbf{360}_X$, whether or not the seat $\mathbf{360}_X$ is occupied, and what role an occupant of the seat $\mathbf{360}_X$ may or may not have in the operation of the vehicle 100 to decide what sounds to produce.

Figure 3:
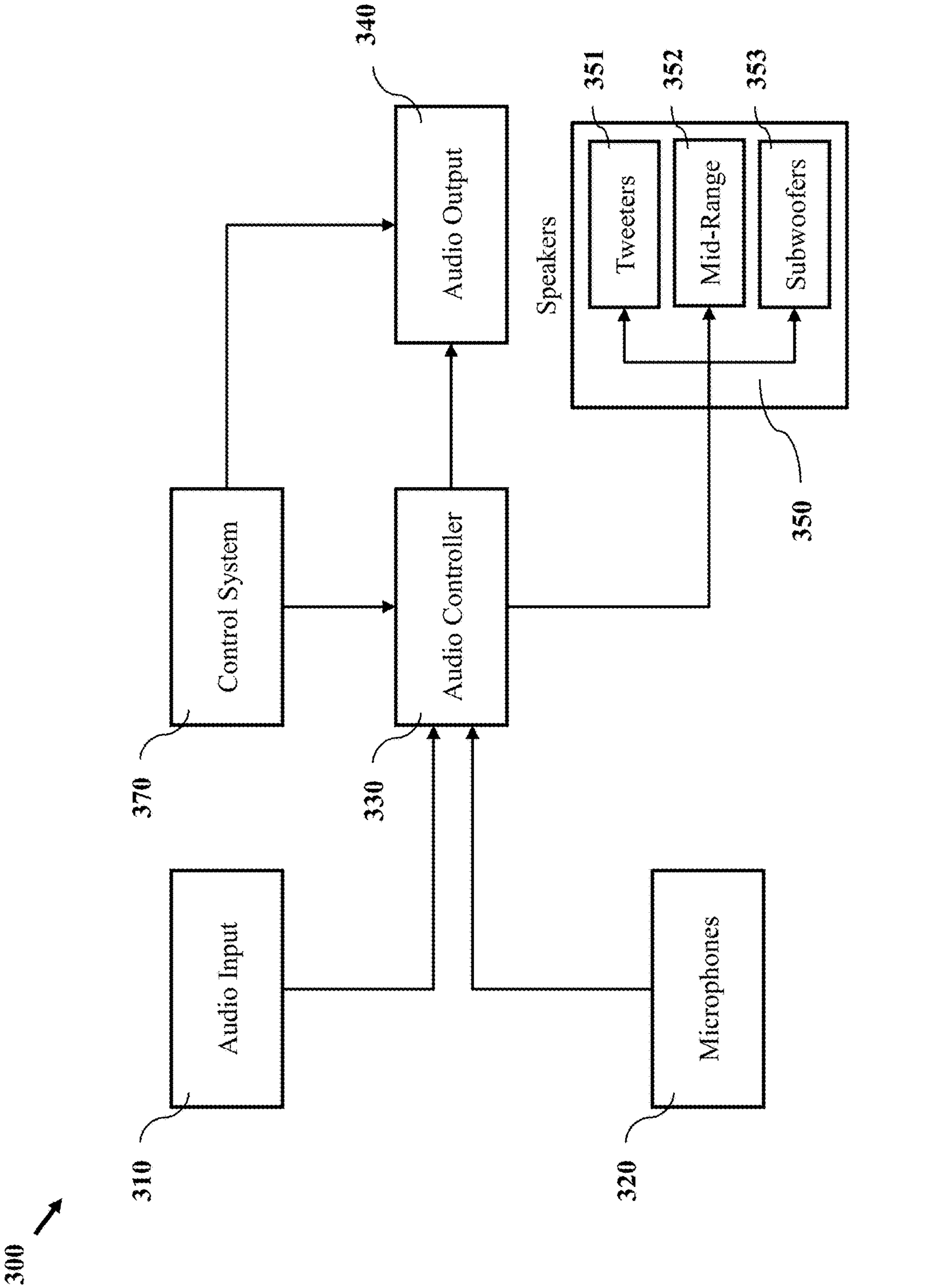
FIG. 3 is a graphical representation of an exemplary embodiment of a personal sound zone associated with a personal sound zone system.

FIG. 3 is a graphical representation of an exemplary embodiment of a personal sound zone 300 associated with a personal sound zone system 200. According to one embodiment, a personal sound zone 300 comprises an audio input 310, a plurality of microphones 320, an audio controller 330, an audio output 340, a plurality of speakers 350, and a control system 370. The plurality of speakers 350 may include a plurality of tweeters 351, a plurality of mid-range speakers 352, and/or a plurality of subwoofers 353.

According to one embodiment, at least one of the plurality of microphones 320 is configured to receive a noise audio signal and produce a noise electronic signal corresponding to the noise audio signal. According to one embodiment, the audio controller 330 is configured to receive a media electronic signal from the audio input 310 and the noise electronic signal received by the at least one of the plurality of microphones 320, convert the noise electronic signal into an anti-noise electronic signal, and produce an output electronic signal by combining the media electronic signal and the anti-noise electronic signal. The media electronic signal received by the audio input 310 may be, for example, from a microphone associated with an occupant of the personal sound zone, a microphone associated with an occupant of another personal sound zone, or an external source. According to one embodiment, the personal sound zone system 200 may facilitate communication between occupants of the plurality of personal sound zones 300 by means of the audio inputs 310.

The audio input 310 can employ one or more means of receiving electronic signals, including for example a 3.5 mm audio jack, a Bluetooth connection, a Wi-Fi connection, etc. Further, it may be possible for the audio input 310 to receive multiple electronic signals at once from a plurality of these means, resulting in a media electronic signal comprised of more than one source electronic signal.

According to one embodiment, the audio controller 330 may send at least a portion of the output electronic signal to another system by means of the audio output 340. The audio controller 330 may also be configured to send the media electronic signal or a portion of the media electronic signal to the audio output 340 without including the noise electronic signal or the anti-noise electronic signal.

According to one embodiment, the audio controller 330 may send the output electronic signal to at least one of the plurality of speakers 350. Each of the plurality of speakers 350 may be configured to receive an output electronic signal and emit an output audio signal corresponding to the output electronic signal. The output audio signal may be designed so that an occupant of the seat 360 hears the sounds associated with the media electronic signal without hearing the noise audio signal received by at least one of the plurality of microphones 320. Essentially, this embodiment of the personal sound zone 300 is designed to cancel out the noise audio signal so that an occupant of the seat 360 can hear the sounds associated with the media electronic signal without interference.

According to one embodiment, the control system 370 is configured to receive at least one of a plurality of commands to control the media electronic signal and the output audio signal of the personal sound zone 300. The control system 370 may receive the at least one of a plurality of commands from an occupant of the personal sound zone 300. Additionally, or alternatively, the control system 370 may receive the at least one of a plurality of commands from a source outside of the personal sound zone 300, including for example another occupant of the vehicle 100. Controlling the media electronic signal may include sending, to an outside audio source, instructions to send a specific media electronic signal to the personal sound zone 300. Such control may include, for example, requesting a specific music playlist from a cloud music service. Controlling the output audio signal may include adjusting the volume of the output audio signal, changing the audio balance settings of the output audio signal, and forwarding the output audio signal to another personal sound zone 300 (see FIG. 6).

Figure 4:
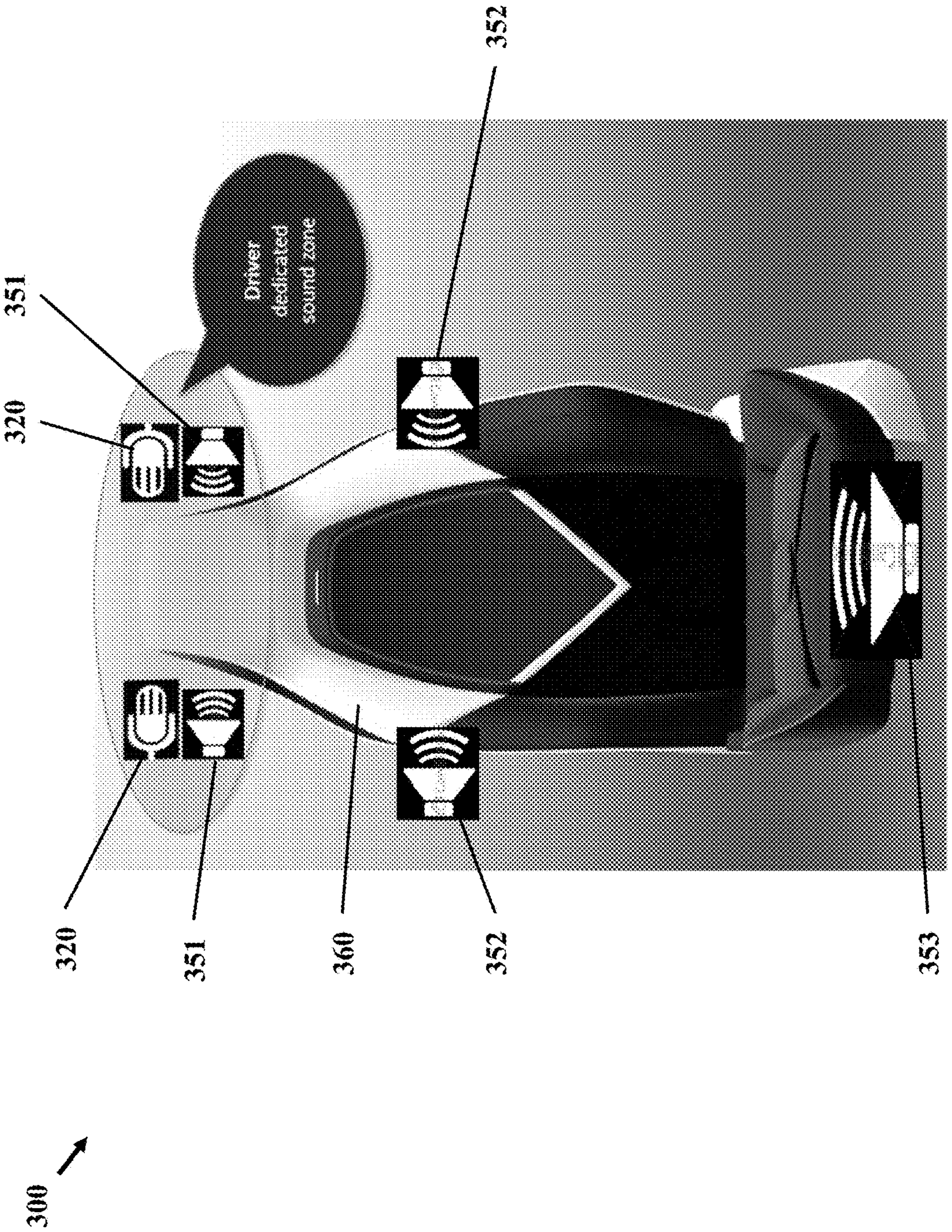
FIG. 4 is a front view of an exemplary embodiment of a vehicle seat including a personal sound zone associated with a personal sound zone system.

FIG. 4 is a front view of an exemplary embodiment of a vehicle seat 360 including a personal sound zone 300 associated with a personal sound zone system 200. According to one embodiment, the plurality of microphones 320 and the plurality of tweeters 351 may be installed in the headrest of the vehicle seat 360, such that the personal sound zone system 200 functions with the depicted personal sound zone 300 focused around the head of an occupant of the vehicle seat 360. The plurality of mid-range speakers 352 may be installed approximately half way up the height of the vehicle seat 360, while a subwoofer 353 may be installed underneath the vehicle seat 360.

According to one embodiment, the plurality of microphones 320 and the plurality of speakers 350 may be arranged such that an occupant of the vehicle seat 360 experiences a stereo audio environment. According to another embodiment, the plurality of microphones 320 and the plurality of speakers 350 may be arranged such that the personal sound zone system 200 is able to emulate a 3D Surround Sound environment.

Figure 5:
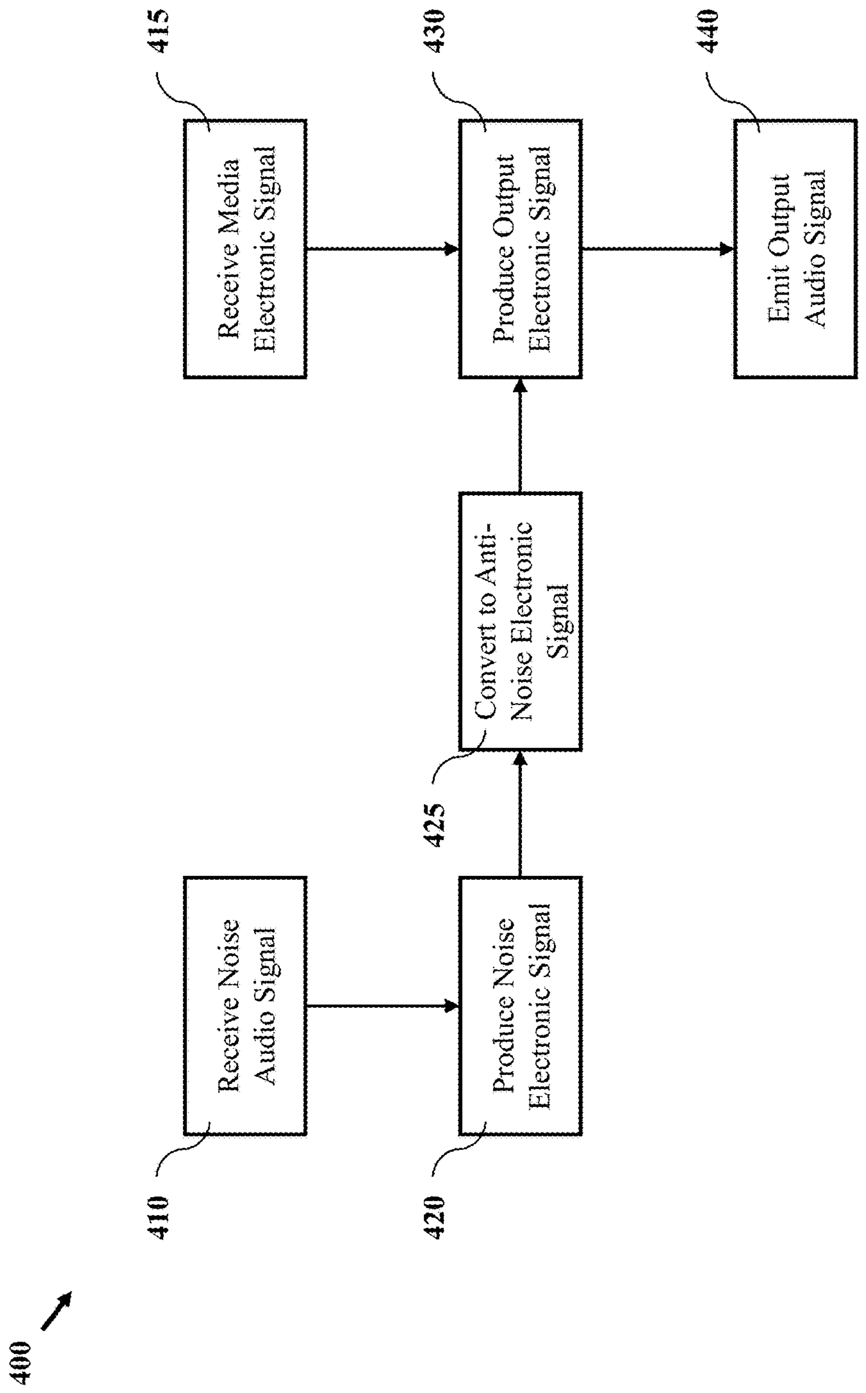
FIG. 5 is a flow chart depicting an exemplary process for the operation of a personal sound zone associated with a personal sound zone system.

FIG. 5 is a flow chart depicting an exemplary process 400 for the operation of a personal sound zone 300 associated with a personal sound zone system 200.

At block 410, according to one embodiment, the process 400 receives a noise audio signal. The noise audio signal may be received by means of a plurality of microphones 320. The process 400 may then produce a noise electronic signal corresponding to the noise audio signal at block 420 by means of the plurality of microphones 320. The process 400 may further convert the noise electronic signal into an anti-noise electronic signal at block 425 by means of an audio controller 330, for example. The anti-noise electronic signal may be configured such that if it were converted into an anti-noise audio signal, the resultant anti-noise audio signal would cancel out the noise audio signal.

At block 415, according to one embodiment, the process 400 may additionally receive a media electronic signal. The media electronic signal may correspond to a media audio signal, with portions of the media electronic signal corresponding to specific types of audio, including but not limited to music, phone calls, audio alerts related to the vehicle 100, audio associated with video data, etc.

According to one embodiment, a given personal audio zone 300$_X$ may receive audio alerts related to the vehicle 100 based on the location or occupant of a seat 360$_X$ corresponding to the given personal audio zone 300$_X$. The specific audio alert may be further based on the identity of the occupant, the expected role of the occupant in the operation of the vehicle 100 (e.g. driver), the position of the occupant and the seat 360$_X$ relative to the rest of the vehicle 100, and so on.

According to one embodiment, at least a portion of the media electronic signal may correspond to a phone call addressed to an occupant of a seat 360$_A$ associated with a given personal audio zone 300$_A$. The portion of the media electronic signal corresponding to a phone call may be included based specifically on the identity of the occupant (i.e. the personal audio zone system 200 as a whole may direct a phone call to a specific personal audio zone 300$_A$ because the personal audio zone system 200 has identified the occupant of that personal audio zone 300$_A$ as the intended recipient of the phone call). According to one embodiment, the occupant of that personal audio zone 300$_A$ may forward or redirect the portion of the media electronic signal corresponding to a phone call to a different personal audio zone 300$_B$ (see FIG. 6).

Once the process 400 has both an anti-noise electronic signal and a media electronic signal, the process may produce an output electronic signal at block 430 by combining the anti-noise electronic signal and the media electronic signal. The process may then convert the output electronic signal to an output audio signal and emit the output audio signal at block 440. The resultant output audio signal may allow an occupant of the personal sound zone 300 to experience the sounds associated with the media electronic signal without interference from the noise audio signal.

According to one embodiment, the process 400 may not receive a media electronic signal, or the media electronic signal corresponds to silence. In this instance, the process may still produce and emit an output audio signal—the resultant output audio signal would simply be based on the anti-noise electronic signal alone and the personal sound zone 300 would serve only to cancel the noise audio signal.

Figure 6:
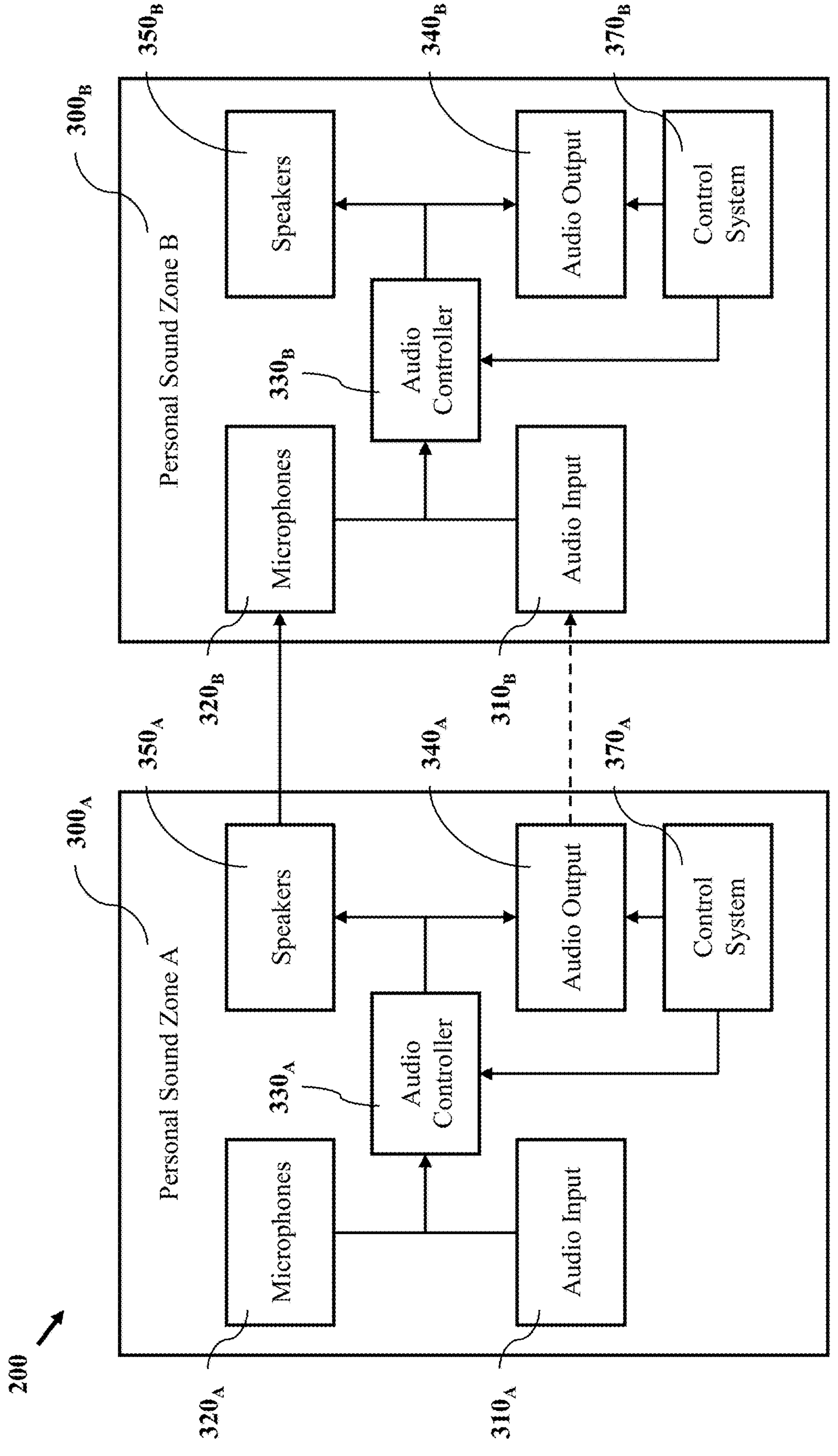
FIG. 6 is a graphical representation of the interaction between two exemplary embodiments of personal sound zones within a personal sound zone system.

FIG. 6 is a graphical representation of the interaction between two exemplary embodiments of personal sound zones 300$_{A-B}$ within a personal sound zone system 200. According to one embodiment, each personal sound zone 300$_X$ may additionally include a control system 370$_X$ configured to receive at least one of a plurality of commands to control the media electronic signal and the output audio signal of the personal sound zone 300$_X$. Controlling the output audio signal of the personal sound zone 300$_X$ may include determining what portions of the media electronic signal received by the audio input 310$_X$ should be forwarded to the audio output 340$_X$ by the audio controller 330$_X$, as well as what other personal sound zones 300 (if any) to send audio data to by means of the audio output 340$_X$.

In one embodiment, a first personal sound zone 300$_A$ may receive a command from its control system 370$_A$ (hereinafter, "first control system") to forward at least a portion of a first media electronic signal to a second personal sound zone 300$_B$. The second personal sound zone 300$_B$ may be chosen from a plurality of other personal sound zones 300$_{1\text{-}N}$ by another command from the first control system 370$_A$. Further, the first control system 370$_A$ may choose more than one personal sound zone 300 to be forwarded at least a portion of the first media electronic signal. The forwarded portion of the first media electronic signal may be different for each of the personal sound zones 300 designated by the first control system 370$_A$ as recipients.

According to one embodiment, the second personal sound zone 300$_B$ may receive the forwarded portion of the first media electronic signal by means of the audio input 310$_B$ of the second personal sound zone 300$_B$ (hereinafter, "second audio input"). The second personal sound zone 300$_B$ may receive at least one other media electronic signal in addition to the forwarded portion of the first media electronic signal from the first personal sound zone 300$_A$. The audio controller 330$_B$ of the second personal sound zone 300$_B$ may receive commands from the control system 370$_B$ of the second personal sound zone 300$_B$ (hereinafter, "second control system") to control which of the plurality of media electronic signals received should be sent to the speakers 350$_B$ and/or the audio output 340$_B$ of the second personal sound zone 300$_B$—that is to say, the second personal sound zone 300$_B$ has the ability to decline or mute the forwarded portion of the first media electronic signal received from the first personal sound zone 300$_A$. The second personal sound zone 300$_B$ may be able to receive additional commands from the second control system 370$_B$, wherein the additional commands may individually control each of the plurality of media electronic signals received by the audio input 310$_B$ of the second personal sound zone 300$_B$.

While this disclosure makes reference to exemplary embodiments, it will be understood by those skilled in the art that various changes in form and details may be made therein without departing from the scope of the claimed embodiments.

What is claimed is:

1. A vehicle with an audio system comprising:
- a first sound zone;
- a second sound zone;
- a first plurality of microphones located in the first sound zone;
- a second plurality of microphones located in the second sound zone;
- wherein the first plurality of microphones is configured to receive a noise audio signal and produce a noise electronic signal corresponding to the noise audio signal;
- a first audio controller corresponding with the first sound zone;
- a second audio controller corresponding with the second sound zone;
- wherein the first controller is configured to:
  - receive a media electronic signal from a first audio input and the noise electronic signal;
  - convert the noise electronic signal into an anti-noise electronic signal; and
  - produce an output electronic signal by combining the media electronic signal and the anti-noise electronic signal; and
- a first plurality of speakers located in the first sound zone;
- a second plurality of speakers located in the second sound zone;
- wherein the first of speakers is configured to receive the output electronic signal and emit an output audio signal corresponding to the output electronic signal;
- wherein the first and second sound zones each has a dedicated sound environment that is separate from the dedicated sound environment of the other sound zone such that the first and second sound zones cancels audio produced by the speakers of the other sound zone;
- a first audio output communicating with the first plurality of speakers;
- a second audio output communicating with the second plurality of speakers;
- a first control system of the first sound zone communicating with the first audio controller and a first audio output of the first sound zone;
- a second control system of the second sound zone communicating with the second audio controller and a second audio output of the second sound zone;
- wherein the first sound zone is configured to send at least a portion of the media electronic signal to the second sound zone via commands sent from the first control system to the first audio output;
- wherein the portion of the media electronic signal sent by the first sound zone is received by a second audio input of the second sound zone;
- wherein the first audio output does not include the noise electronic signal or the anti- noise electronic signal; and
- wherein the second audio input is configured to receive a second media electronic signal in addition to the first media electronic signal received.

2. The vehicle of claim 1, wherein the second sound zone is configured to selectively decline the portion of the first media electronic signal via the second control system.

3. The vehicle of claim 2, wherein the first plurality of microphones and the first plurality of speakers are located in a first seat of the vehicle, and the second a first plurality of microphones and the second plurality of speakers are located in a second seat of the vehicle.

4. The vehicle of claim 1, wherein at least a portion of the media electronic signal received by a personal sound zone corresponds to a phone call.

5. The vehicle of claim 1, wherein one of the commands is a command to send the media electronic signal of that personal sound zone to a third sound zone.

6. The vehicle of claim 1, wherein at least a portion of the media electronic signal received by a personal sound zone includes video data for display on a display device associated with that personal sound zone.

7. An audio system configured to operate in a vehicle interior having a first sound zone and a second sound zone, the audio system comprising:
- a first plurality of microphones located in the first sound zone;
- a second plurality of microphones located in the second sound zone;
- wherein the first plurality of microphones is configured to receive a noise audio signal and produce a noise electronic signal corresponding to the noise audio signal;
- a first audio controller corresponding with the first sound zone;
- a second audio controller corresponding with the second sound zone;
- wherein the first controller is configured to:
  - receive a media electronic signal from a first audio input and the noise electronic signal;

convert the noise electronic signal into an anti-noise electronic signal; and produce an output electronic signal by combining the media electronic signal and the anti-noise electronic signal; and a first plurality of speakers located in the first sound zone;

a second plurality of speakers located in the second sound zone;

wherein the first of speakers is configured to receive the output electronic signal and emit an output audio signal corresponding to the output electronic signal;

wherein the first and second sound zones each has a dedicated sound environment that is separate from the dedicated sound environment of the other sound zone such that the first and second sound zones cancels audio produced by the speakers of the other sound zone;

a first audio output communicating with the first plurality of speakers;

a second audio output communicating with the second plurality of speakers;

a first control system of the first sound zone communicating with the first audio controller and a first audio output of the first sound zone;

a second control system of the second sound zone communicating with the second audio controller and a second audio output of the second sound zone;

wherein the first sound zone is configured to send at least a portion of the media electronic signal to the second sound zone via commands sent from the first control system to the first audio output;

wherein the portion of the media electronic signal sent by the first sound zone is received by a second audio input of the second sound zone;

wherein the first audio output does not include the noise electronic signal or the anti-noise electronic signal; and wherein the second audio input is configured to receive a second media electronic signal in addition to the first media electronic signal received.

8. The vehicle of claim 7, wherein the second sound zone is configured to selectively decline the portion of the first media electronic signal via the second control system.

9. The vehicle of claim 8, wherein the first plurality of microphones and the first plurality of speakers are located in a first seat of the vehicle, and the second a first plurality of microphones and the second plurality of speakers are located in a second seat of the vehicle.

10. The vehicle of claim 7, wherein at least a portion of the media electronic signal received by a personal sound zone corresponds to a phone call.

11. The vehicle of claim 7, wherein one of the plurality of commands is a command to send the media electronic signal of that personal sound zone to a third sound zone.

12. The vehicle of claim 7, wherein at least a portion of the media electronic signal received by a personal sound zone includes video data for display on a display device associated with that personal sound zone.

13. An audio system configured to operate in a first sound zone and a second sound zone, wherein each of the sound zones is associated with a seat located in a vehicle the audio system comprising:

a first plurality of microphones located in the first sound zone;

a second plurality of microphones located in the second sound zone;

wherein the first plurality of microphones is configured to receive a noise audio signal and produce a noise electronic signal corresponding to the noise audio signal;

a first audio controller corresponding with the first sound zone;

a second audio controller corresponding with the second sound zone;

wherein the first controller is configured to:

receive a media electronic signal from a first audio input and the noise electronic signal;

convert the noise electronic signal into an anti-noise electronic signal; and produce an output electronic signal by combining the media electronic signal and the anti-noise electronic signal; and a first plurality of speakers located in the first sound zone;

a second plurality of speakers located in the second sound zone;

wherein the first of speakers is configured to receive the output electronic signal and emit an output audio signal corresponding to the output electronic signal;

wherein the first and second sound zones each has a dedicated sound environment that is separate from the dedicated sound environment of the other sound zone such that the first and second sound zones cancels audio produced by the speakers of the other sound zone;

a first audio output communicating with the first plurality of speakers;

a second audio output communicating with the second plurality of speakers;

a first control system of the first sound zone communicating with the first audio controller and a first audio output of the first sound zone;

a second control system of the second sound zone communicating with the second audio controller and a second audio output of the second sound zone;

wherein the first sound zone is configured to send at least a portion of the media electronic signal to the second sound zone via commands sent from the first control system to the first audio output;

wherein the portion of the media electronic signal sent by the first sound zone is received by a second audio input of the second sound zone;

wherein the first audio output does not include the noise electronic signal or the anti-noise electronic signal; and wherein the second audio input is configured to receive a second media electronic signal in addition to the first media electronic signal received.

14. The vehicle of claim 13, wherein the second sound zone is configured to selectively decline the portion of the first media electronic signal via the second control system.

* * * * *